Nov. 30, 1943.                A. J. MATTER                2,335,525
                              MULTIPLE VALVE
                          Filed Nov. 12, 1940         3 Sheets-Sheet 1
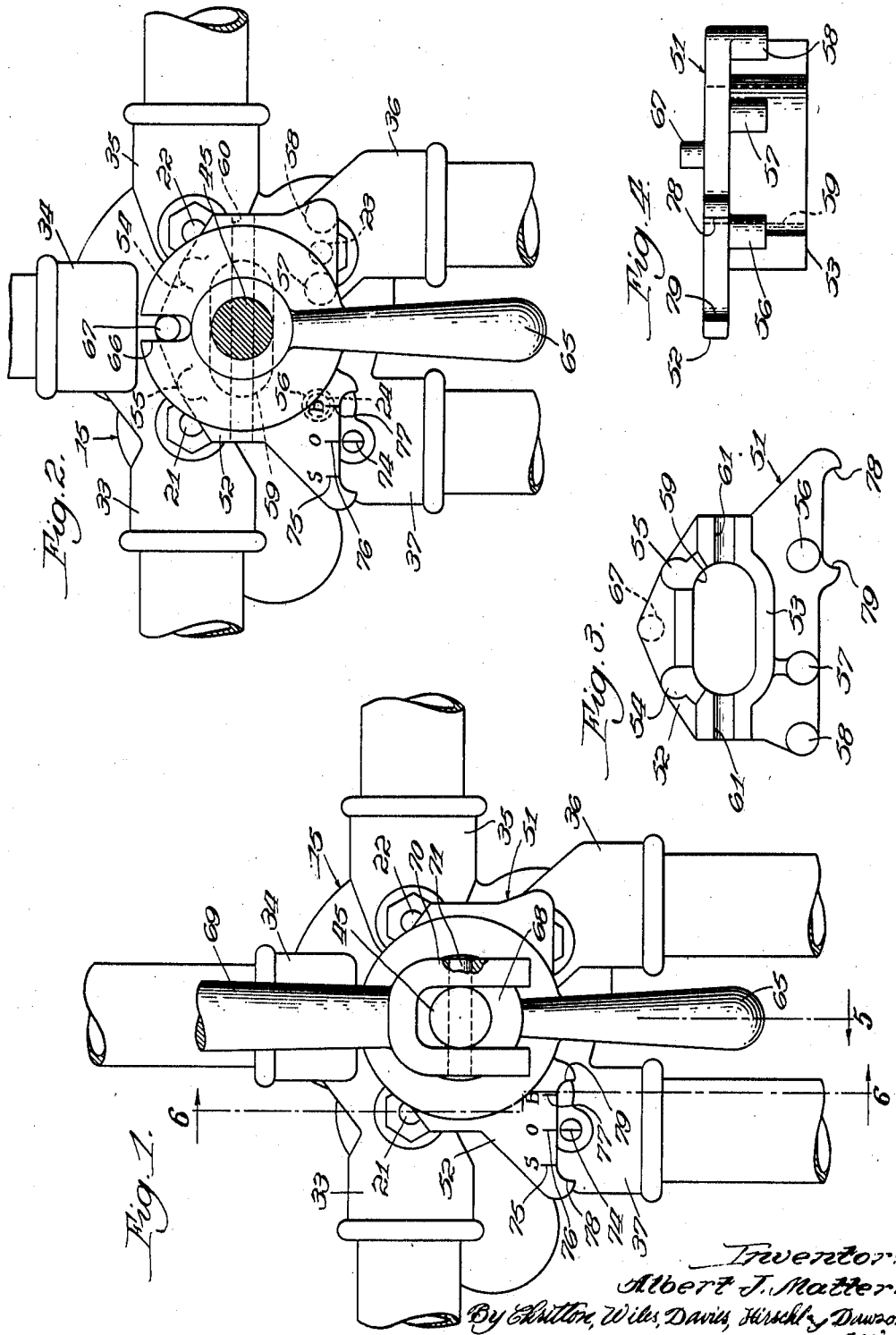

Nov. 30, 1943.　　　A. J. MATTER　　　2,335,525
MULTIPLE VALVE
Filed Nov. 12, 1940　　　3 Sheets-Sheet 2

Inventor:
Albert J. Matter
By Chitton, Wiles, Davies, Hirschl & Dawson
Attys.

Nov. 30, 1943.                A. J. MATTER                2,335,525
                              MULTIPLE VALVE
                          Filed Nov. 12, 1940           3 Sheets-Sheet 3
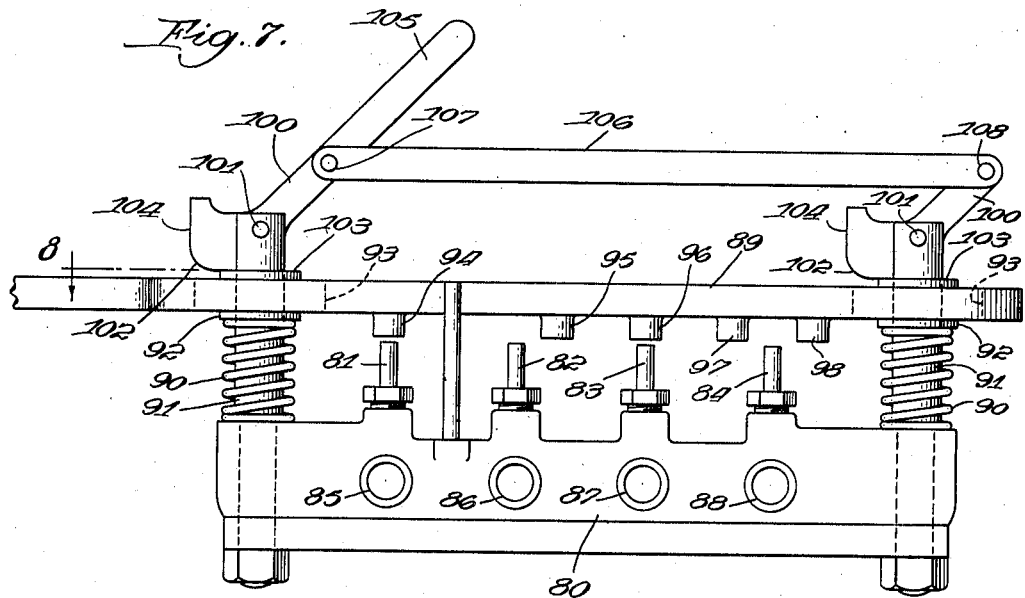
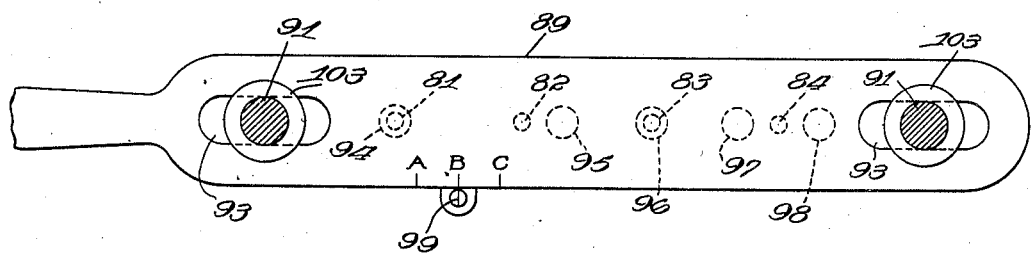
Inventor:
Albert J. Matter.
By Chritton, Wiles, Davies, Hirsch & Dawson.
Attys.

Patented Nov. 30, 1943

2,335,525

UNITED STATES PATENT OFFICE 2,335,525

MULTIPLE VALVE

Albert J. Matter, Park Ridge, Ill.

Application November 12, 1940, Serial No. 365,349

22 Claims. (Cl. 137—144)

My invention relates to multiple valves provided, by the incorporation therein of selector means, for the controlling of flowable material selectively through a plurality of passages, interconnecting or not, such, as for example, as in the case of water-softening apparatus wherein controls are provided for establishing a water softening course through the apparatus, a backwashing course and a regenerating course, as for example through which brine is circulated, all under the control of the operator.

My object generally stated is to provide certain improvements in multiple valves to the end of reducing the cost of construction thereof, simplifying the structure; minimizing the number of parts required; reducing the cost of parts and minimizing the amount of machining required; and other more specific objects as will be understood from the following description.

Referring to the accompanying drawings:

Figure 1 is a face view of a multiple valve embodying my improvements and adapted more particularly as the control means for a water-softening apparatus, the parts being shown in normal position, viz., with all of the valves closed.

Figure 2 is a view like Fig. 1 of the construction therein shown and with the parts in the same position, certain of the parts being omitted to better disclose otherwise hidden details.

Figure 3 is a rear view of a selector member forming a part of the device of Figs. 1 and 2.

Figure 4 is a side view of the selector member.

Figure 7 is a face view of another embodiment of my invention; and

Figure 5:
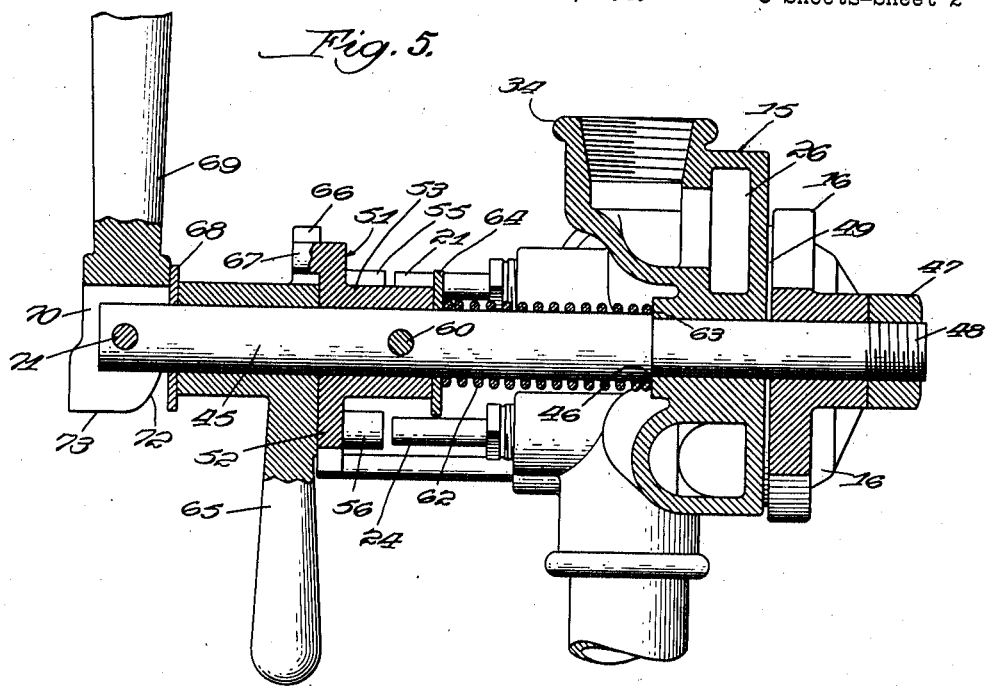
Figure 5 is a view in longitudinal sectional elevation of the device of Figs. 1 and 2, with the parts in the same position, the section being taken at the line 5 on Fig. 1 and viewed in the direction of the arrow.

Figure 8, a sectional view taken at the line 8 on Fig. 7 and viewed in the direction of the arrow.

Referring to the construction shown in Figs. 1–6, inclusive, it comprises a valve casing 15 open at one end at which it is provided with a cover plate 16, and four valves certain of which are shown at 17 and 20 of the spring-pressed poppet type having stems 21, 22, 23 and 24, respectively, and grouped about the longitudinal center of the valve device.

The valves are provided for the controlling of the flow of fluid through several passages within the valve casing 15, the valve casing having an inlet which, in the use of the valve device as a control for a water softening apparatus, would connect with the source of water to be softened, as, for example, the city water pressure, and having internally threaded bosses 33—37 inclusive, communicating with the several passages in the valve casing 15 and provided for connection with pipes through which the fluid is to be selectively directed.

These several valves are urged to positions in which they close the ports with which they cooperate, by coil springs 43 interposed between them and the cover plate 16 which is provided with teats 44 for holding the springs in position, and unseated selectively as hereinafter described, the seats for these valves, those for the valves 17 and 20 being represented at 17a and 20a, being formed by counterboring the metal of the rear surfaces of the front walls of the passages controlled by these valves.

The valve device also comprises means for selectively operating these valves as desired, a description of these means being as follows:

Extending longitudinally and centrally through the valve device is a stud 45 shouldered adjacent one end as represented at 46. Between this shoulder and a nut 47 screwed on the threaded end 48 of the stud, the valve casing 15 and the cover 16 are rigidly clamped together, with the circular gaskets 49 interposed between the cover 16 and the casing 15 the gaskets 49, seating in counterbores 15a in the valve casing 15 and counterbores 16a in the cover 16, and surrounding and lapping openings certain of which are shown at 50 in the rear face of the valve casing in alinement, longitudinally of the valve device, with the valve seats and of not less diameter and through which the valves are assembled to place from the back of the valve casing, thereby preventing leakage from the various passages controlled by these valves.

Surrounding and slidable along, and movable in a straight line direction crosswise of, the stud 45, is a selector member 51 provided in the form of a plate 52 having a sleeve portion 53 integral therewith, the plate 52 being provided with a plurality of rearwardly extending valve-actuating bosses shown as five in number and represented at 54, 55, 56, 57 and 58 and so grouped or clustered about the stud 45 that by shifting the selector member 51 crosswise of the stud into different positions certain selected ones of these bosses align with certain selected ones of the valves, which latter are operated to open position when the selector member is moved rearwardly as hereinafter described.

To adapt the selector member 51 for movement as above stated and hold it against rotation on the stud 45, the member 51 has an elongated opening 59 extending therethrough and through which the stud 45 extends which permits movement of the member 51 crosswise of the stud; and the stud is provided with a pin 60 extending crosswise thereof and secured to the stud, the ends of the pin being entered in diametrically opposed slots 61 in the sleeve portion 53 of the member 51, these slots extending lengthwise of the stud.

A coil spring 62 surrounding the stud 45, and interposed between the surface 63 of the valve casing 15 and a washer 64 slidable on the stud 45 and abutting the sleeve portion 53 of the selector member 51 serves to normally hold the selector member in retracted, normal position (Figs. 1, 2, and 5).

The selector member 51 is shown as moved crosswise of the stud 45 into any desired selected position, by a lever device 65 journaled on, and slidable along, the stud 45 and having a radial slot 66 into which a projection 67 on the selector member 51 extends. The selector member being restrained from rotation on the stud 45 by the pin 60, force applied to the projection 67 when the lever 65 is swung on the stud, operates to transmit straight line movement to the selector member 51 in one direction or the other depending on the direction in which the lever 65 is swung.

Figure 6:
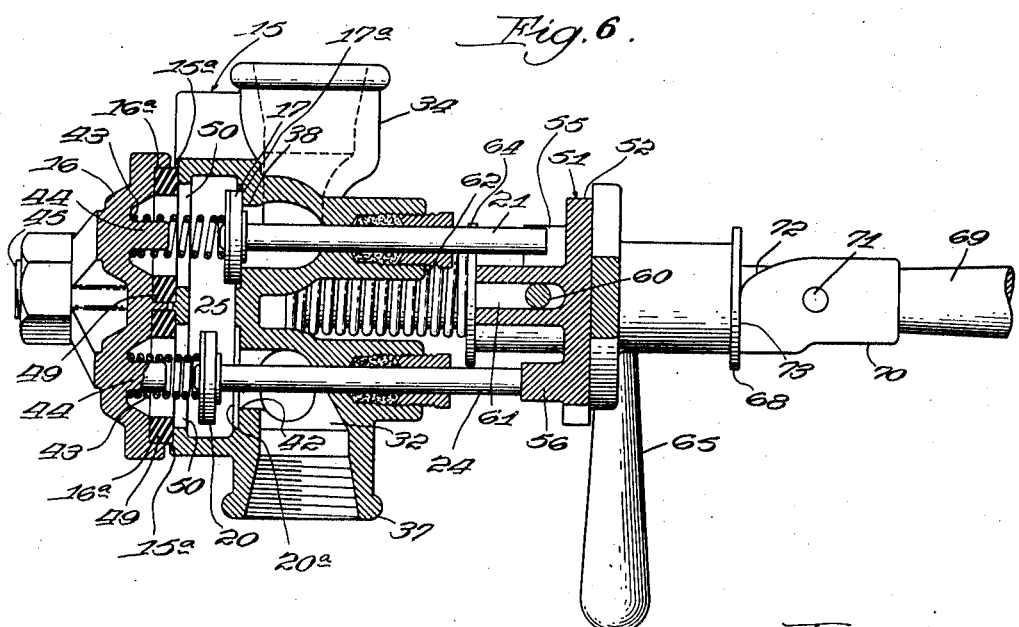
Figure 6 is a similar view, the section being taken at the irregular line 6—6 on Fig. 1 and viewed in the direction of the arrows but showing the parts operated to valve-opening position.

The spring 62 serves to exert force, through the washer 64, against the selector member 51 urging it toward the lever device 65 which latter, in turn, bears against a washer 68 slidable on the stud 45, the washer 68 abutting a lever 69 pivoted at a yoke 70 thereon, by means of a pin 71, to the outer end of the stud 45, the lever 69 having cam surfaces 72 which operate in the swinging of this lever from the upright position shown in Figs. 1, 2, and 5 to the position shown in Fig. 6, to shift the selector member 51 to the right in Fig. 5 against the resistance of the spring 62 and, through the lever 65 and washer 64, into a position in which the valve or valves which align with certain of the bosses 54—58 on the selector member, depending on the position of the selector member crosswise of the stud 45 (Fig. 6), is, or are, opened. Flat surfaces 73 on the lever 69 adjacent the cam surfaces 72 serve, upon the operator releasing his grasp on the lever 69, to hold this lever and the parts operated thereby as stated, in the position to which they are actuated.

The particular illustrated construction of valve device contemplates the manipulation thereof selectively into three positions controlled by the position of the selector member 51 crosswise of the stud 45 for effecting selective fluid flow. To guide the operator in properly positioning the selector member indexing means are provided, these means comprising a mark 74 on the valve casing 15 and three marks 75, 76 and 77 on an edge of the selector member 51, adjacent the mark 74, and lettered S, O and B, respectively, for indicating the three positions; the selector member having stops 78 and 79 at the ends of the scale 75, 76 and 77 to aid in properly setting it.

The arrangement of the valves and the bosses 54—58 is such as shown that when the valve device is in the operating position, in which the selector member 51 is shown in the drawings, the boss 56 is in line with the valve 20, and when the lever 69 is operated to the position shown in Fig. 6, the only valve which is opened is valve 20, effecting fluid flow through the course controlled by this valve.

When the selector member 51 is shifted to the left in Figs. 1 and 2 to align the mark 77 with the mark 74 for effecting another positioning of the valve device (it being understood that prior to this operation the lever 69 has been returned to vertical position (Fig. 1) and therefore the selector member 51 under the action of the spring 62 has been moved out of engagement with the valve 20) the bosses 58 and 54 are in line with the valves on the stems 23 and 21, respectively, and when the lever 69 is operated these two valves only will be opened effecting fluid flow through the courses controlled by these two valves.

When the selector member 51 is shifted to the right in Figs 1 and 2 to align the mark 75 with the mark 74 for effecting another positioning of the valve device (lever 69 having been previously returned to the vertical position shown in Fig. 1) the bosses 57 and 54 are in line with the valves on the stems 23 and 22, respectively, and when the lever 69 is operated these two valves only will be opened effecting fluid flow through the courses controlled by these two valves.

Referring now to Figs. 7 and 8 the construction therein shown illustrates an embodiment of my invention wherein the valves to be selectively operated, instead of being grouped in a continuous series or clustered as in the preceding figures of the drawings, are disposed in a straight-line arrangement.

This construction comprises a valve casing 80 supported in any suitable way and having any suitable arrangement of valves therein, as for example four poppet valves, independently spring-pressed to closed position, controlling passages extending, as for example, crosswise of the valve casing, the stems of the four valves being represented at 81, 82, 83 and 84 and the corresponding four passages illustrated being represented at 85, 86, 87 and 88.

Extending lengthwise of, and along, the valve casing 80, is a valve-operating bar 89 mounted on coil springs 90 surrounding posts 91 rigidly secured at their lower ends to the ends of the valve casing 80 and interposed between the latter and the bar 89, washers 92 being confined between the upper ends of the springs 90 and the bar 89.

The bar 89 contains openings 93 elongated lengthwise of the bar through which the posts 91 extend, adapting this bar to be moved lengthwise of the casing 80 into different positions thereon.

Depending bosses are provided on the bar 89 in a series directly above, and in alignment with, the series of valves below them, these bosses being so spaced apart as to operate the selected ones of the valves in the several selected positions of the bar 89, by abutment against them in the depressing of this bar as hereinafter described.

In the particular arrangement shown, which, however, is only by way of example of various arrangements which may be provided for, five of such bosses represented at 94, 95, 96, 97 and 98, are provided, these bosses being so spaced apart and so related to the spacing of the valves below them that when the bar 89 occupies a lengthwise position in which the marking B on the bar 89 aligns with the marking 99 on the valve casing 80 as shown in the drawings, the bosses 94 and 96 will be directly in line with the valve stems 81 and 83, respectively, and when the bar 89 is depressed only the valves on these particular stems will be operated to open the passages 85 and 87 for passage of flowable material therethrough; when the bar is shifted lengthwise to the right in the drawings to a position in which the marking A on the bar 89 aligns with the indexing mark 99, the boss 97 will align with the valve stem 84 and when the bar 89 is depressed the valve connected with this particular valve stem, only, will be opened; and when the bar 89 is shifted lengthwise to the left to a position in which the marking C on the bar aligns with the indexing mark 99 the bosses 95 and 98 will be in line with the valve stems 82 and 84 and the two valves on these two particular stems only will be opened.

The means shown for depressing the bar 89 to actuate the selected valve or valves, as the case may be, comprises a pair of levers 100 located in slots (not shown) in the upper ends of the posts 91 and fulcrumed thereon by pins 101 on the posts, each of these levers having cam surfaces 102 which, when the levers 100 are swung upwardly to the left in Fig. 7, press downwardly washers 103 surrounding, and slidable on, the posts 91 and force the bar 89 downwardly against the resistance of the springs 90, to actuate the selected valve or valves. Beyond the cam surfaces 102 are flat surfaces 104 which, following the action of depressing the bar 89, engage the washers 103 and hold this bar depressed.

In order that the levers 100 may be operated simultaneously through force applied directly to one lever only, as at the handle portion 105 of one of these levers, the levers are cross connected by a link 106 pivoted at 107 and 108 to portions of these levers above their fulcrums.

As will be understood from the foregoing a valve device constructed in accordance with my invention involves a minimum number of parts and a minimum of machining whereby it may be produced at relatively low cost. The provision of the cover 16 at the back of the device provided as shown and described, eliminates the necessity of providing expensive plugs and the tapping of the structure to receive them; and the seats for the several valves and the counterbores for the gaskets 49 in the valve casing may be machined with one tool all at the same time.

Furthermore, as to the construction shown in Figs. 1 to 6, inclusive, this construction requires only one stud for holding together all of the parts of the valve-operating selector mechanism, the valve casing and the cover, which makes for great simplification of structure.

An important feature of my invention is that preliminary to the adjustment of the selector member from one selected position to another, the selector member is retracted to a position in which it is removed from engagement with all of the valves, the valves automatically closing in such operation, and thus danger of the flow of the flowable material at any time, except through the desired selected courses, is avoided.

While I have illustrated and described certain particular embodiments of my invention, I do not wish to be understood as intending to limit the invention thereto, as the same may be variously modified and altered and the invention embodied in other forms of structure, without departing from the spirit of the invention. In this connection, it will be understood that, if desired, operation of the selected valves, pursuant to the adjustment of the selector member into any selected position, instead of being operated simultaneously as in the construction shown may be operated in succession, either by varying the lengths of the valve-actuating bosses or the stems of the valves.

What I claim as new and desire to secure by Letters Patent, is:

1. A multiple valve comprising a valve casing having passages and comprising a body portion and a separate cover for certain of said passages, a plurality of valves controlling said passages, stud means having means for clamping said body portion and cover together, and valve-operating means carried by said stud means.

2. A multiple valve comprising a valve casing having passages and comprising a body portion and a separate cover for certain of said passages, a plurality of valves controlling said passages, stud means having means for clamping said body portion and cover together, and valve-operating selector means mounted on said stud means and comprising a selector member movable into different positions for selective operation of said valves.

3. A multiple valve comprising a valve casing member having passages and open at one side, a cover member, said casing member having a plurality of counterbored valve-seats for valves controlling said passages, and a plurality of counterbored gasket-seats carried by one of said members, said gasket-seats being at the open side of the member carrying the same, gaskets in said gasket seats, said valve-seats being located inwardly of said gasket-seats and facing toward the open side of said casing, said valve-seats and said gasket-seats being in alignment with each other and said gasket-seats of not less diameter than said valve-seats.

4. A multiple valve comprising a valve casing having passages and comprising a body portion and a separate cover for certain of said passages, a plurality of valves controlling said passages, springs for said valves interposed between said valves and said cover, and a centrally disposed stud having means for clamping said body portion and cover together, in which position of said cover said springs are held in position.

5. A multiple valve comprising a valve casing formed of a body having passages and a cover for said passages, a plurality of valves controlling said passages, stud means on said casing having means to clamp said body and cover together, a selector member on said stud means and by means of which said valves are selectively operated, said selector member being slidable along and movable in a substantially straight line path crosswise of said stud means, and means pivoted on said stud means for sliding said selector member to valve-operating position.

6. A multiple valve comprising an elongated valve casing having passages, a plurality, more than two of valves arranged in at least one straight line series spaced longitudinally in said casing, a stud adjacent each end of said casing, a selector member formed with slots embracing the respective studs to guide the member in longitudinal reciprocating movement, means associated with said member to effect a selection of one or more valves to be actuated, said member reciprocable longitudinally to different operating positions, a cam pivoted on each stud, a bar connecting said cams for simultaneous operation, said cams when actuated in one direction acting to depress said selector member to actuate selected valves.

7. Selective operating means for stems reciprocable in a casing, comprising, in combination, a stud on said casing having a cross pin, a selector member operatively associated with said stud operative to selectively actuate said stems, means whereby said selector member slidable along said stud for stem actuation, and means whereby said member is movable crosswise of said stud for stem selection, said member having a slot extending lengthwise of said stud into which said pin extends to guide the sliding movement of said member.

8. Selective operating means for stems reciprocable in a casing, comprising, in combination, stud means on said casing, a selector member operatively associated with said stud means operative to selectively actuate said stems, means whereby said selector member is slidable along said stud means for stem-actuation, means whereby said member is movable in a substantially straight line path crosswise of said stud means for stem selection, spring means urging said selector member out of stem operating position, means for shifting said selector member crosswise of said stud means, and means mounted on said stud means for sliding said selector member against the resistance of said spring means for stem actuation.

9. Selective operating means for stems reciprocable in a casing, comprising, in combination, stud means on said casing, a selector member operatively associated with said stud means operative to selectively actuate said stems, means whereby said selector member is slidable along said stud means for stem actuation, means whereby said member is movable in a substantially straight line path crosswise of said stud means for stem selection, and means mounted on said stud means for sliding said selector member for stem actuation.

10. Selective operating means for stems reciprocable in a casing, comprising, in combination, a stud on said casing, a selector member operatively associated with said stud operative to selectively actuate said stems, said selector member being slidable along said stud for stem actuation, and movable in a substantially straight line path crosswise of said stud for stem selection, means for shifting said selector member crosswise of said stud, and means mounted on said stud for sliding said selector member for stem actuation.

11. Selective operating means for stems reciprocable in a casing, comprising, in combination, a stud on said casing, a selector member operatively associated with said stud operative to selectively actuate said stems, said selector member slidable along said stud for stem actuation, and movable crosswise of said stud for stem selection, means rotatable on said stud for shifting said selector member crosswise of said stud, and means on said stud for sliding said selector member for stem actuation.

12. Selective operating means for stems reciprocable in a casing, comprising, in combination, a stud on said casing, a selector member operatively associated with said stud operative to selectively actuate said stems, said selector member being slidable along said stud for stem actuation, and movable in a substantially straight line path crosswise of said stud for stem selection and having a projection, means rotatable on said stud and engaging said projection for shifting said selector member crosswise of said stud and means for sliding said selector member to stem-operating position.

13. Selective operating means for stems reciprocable in a casing, comprising, in combination, a stud on said casing, a selector member operatively associated with said stud operative to selectively actuate said stems, said selector member being slidable along said stud for stem actuation, and movable crosswise of said stud for stem selection, a spring urging said selector member out of stem-operating position, a second member on and slidable along said stud for shifting said selector member crosswise of said stud, and means on said stud, beyond said second-named member, for moving said members toward said stems against the resistance of said spring, to actuate the selected stem or stems.

14. Selective operating means for stems reciprocable in a casing, comprising, in combination, a stud on said casing, a selector member operatively associated with said stud operative to selectively actuate said stems, said selector member being slidable along said stud for stem actuation, and movable in a substantially straight line path crosswise of said stud for stem selection, and means pivoted on said stud for sliding said selector member for stem actuation.

15. Selective operating means for stems reciprocable in a casing, comprising, in combination, said stems longitudinally spaced in said casing in at least one series, stud means on said casing, stem-operating selector means reciprocable across said stud means lengthwise of said series into different positions for selective operation of said stems, means carried by said selector means for operation of different combinations of stems into said different positions, and means mounted on said stud means for moving said selector member for stem actuation.

16. Selective operating means for multiple reciprocable stems comprising, in combination: a plurality of reciprocable stems, a stud associated therewith, selector means slidable across said stud into and out of stem-actuating position, a part rotatable on said stud for setting said selector means into different stem actuating positions, and means on said stud for sliding said selector means along said stud for stem actuation.

17. Selective operating means for stems reciprocable in a casing and arranged in a line comprising, in combination, studs spaced apart on said casing, a selector member operatively associated with said studs operative to selectively actuate said stems, said selector member being slidable along said studs for stem actuation and movable in a substantially straight line path crosswise of said studs for stem selection, and means pivoted on said studs for sliding said selector member for stem actuation.

18. Selective operating means for stems reciprocable in a casing and arranged in at least one straight line series spaced longitudinally in said casing, studs adjacent each end of said casing, a selector member for selectively actuating said stems, said selector member formed with slots embracing the respective studs to guide said member in longitudinal reciprocating movement and slidable along said studs, means associated with said member to effect a selection of one or more valves to be actuated, said member reciprocable longitudinally into different operating positions, a cam pivoted on each stud and a bar connecting said cams for simultaneous operation, said cams when actuated in one direction acting to depress said selector member to actuate the selected stems.

19. Selective operating means for stems reciprocable in a casing, comprising, in combination, stud means on said casing, a selector member operatively associated with said stud means operative to selectively actuate said stems, means mounted on said stud means for sliding said selector member along said stud means for stem actuation, and means whereby said member is movable in a substantially straight line path crosswise of said stud means for stem selection.

20. Selective operating means for stems reciprocable in a casing, comprising, in combination, stud means on said casing, a selector member operatively associated with said stud means, operative to selectively actuate said stems, means mounted on said stud means for sliding said selector member along said stud means for stem actuation, means whereby said member is movable in a substantially straight line path crosswise of said stud means for stem selection, and means for shifting said selector member crosswise of said stud means.

21. Selective operating means for stems reciprocable in a casing, comprising, in combination, stud means on said casing, a selector member operatively associated with said stud means operative to selectively actuate said stems, means whereby said selector member is slidable along said stud means for stem actuation, means whereby said member is movable in a substantially straight line path crosswise of said stud means for stem selection and means mounted on said stud means for sliding said selector member along said stud means for stem actuation.

22. Selective operating means for stems reciprocable in a casing, comprising, in combination, stud means on said casing, a selector member operatively associated with said stud means operative to selectively actuate said stems, means mounted on said stud means for sliding said selector member along said stud means for stem actuation, means whereby said member is movable in a substantially straight line path crosswise of said stud means for stem selection, and spring means urging said selector member out of stem operating position.

ALBERT J. MATTER.